(12) United States Patent
Park et al.

(10) Patent No.: US 10,284,009 B2
(45) Date of Patent: May 7, 2019

(54) UNINTERRUPTIBLE POWER SUPPLY (71) Applicant: SAMSUNG SDI CO., LTD., Yongin-si, Gyeonggi-do (KR)

(72) Inventors: Sangsoo Park, Yongin-si (KR); Hyunsang Cho, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 162 days.

(21) Appl. No.: 15/273,411

(22) Filed: Sep. 22, 2016

(65) Prior Publication Data

US 2017/0093207 A1 Mar. 30, 2017

(30) Foreign Application Priority Data

Sep. 24, 2015 (KR) ........................ 10-2015-0135348

(51) Int. Cl.
*H02J 9/00* (2006.01)
*H02J 9/06* (2006.01)
*H02J 7/00* (2006.01)

(52) U.S. Cl.
CPC .............. *H02J 9/061* (2013.01); *H02J 7/007* (2013.01); *H02J 7/0013* (2013.01); *H02J 7/0052* (2013.01); *H02J 7/0068* (2013.01); *H02J 9/00* (2013.01); *H02J 9/062* (2013.01); *H02J 2007/0059* (2013.01)

(58) Field of Classification Search
CPC ...... H02J 9/00; H02J 9/04; H02J 9/061; H02J 9/062; Y10T 307/615; Y10T 307/625
USPC ...................................................... 307/64–68
See application file for complete search history.

(56) References Cited

U.S. PATENT DOCUMENTS

| 6,268,711 B1* | 7/2001 | Bearfield ............. H02J 7/0024 320/116 |
| 2011/0133556 A1 | 6/2011 | Choi |
| 2011/0175451 A1 | 7/2011 | Moon |
| 2012/0176094 A1* | 7/2012 | Okuda ................ H01M 10/441 320/134 |

(Continued)

FOREIGN PATENT DOCUMENTS

| EP | 2587621 A1 | 5/2013 |
| EP | 2757652 A1 | 7/2014 |

(Continued)

OTHER PUBLICATIONS

EPO Office Action dated Oct. 31, 2017, for corresponding European Patent Application No. 16190578.1 (9 pages).

(Continued)

*Primary Examiner* — Hal Kaplan
*Assistant Examiner* — Rasem Mourad
(74) *Attorney, Agent, or Firm* — Lewis Roca Rothgerber Christie LLP (57) ABSTRACT

An uninterruptible power supply includes a battery unit including battery racks divided into at least one first battery rack including a first battery and at least one second battery rack including a second battery; an overall control unit configured to determine an operation mode of the battery unit from among a discharge mode and a charge mode, and a measurement unit configured to monitor an amount of accumulated power consumption of the load during each of a plurality of time periods and transmitting data associated with the monitoring to the overall control unit.

11 Claims, 5 Drawing Sheets

(56) References Cited

U.S. PATENT DOCUMENTS

| | | | |
|---|---|---|---|
| 2013/0049698 A1* | 2/2013 | Jung | H02J 7/0016 320/134 |
| 2013/0249494 A1* | 9/2013 | Ju | H02J 7/0029 320/134 |
| 2013/0278216 A1* | 10/2013 | Son | H02J 9/062 320/112 |
| 2014/0197798 A1* | 7/2014 | Hongo | H01M 10/44 320/134 |
| 2015/0035359 A1 | 2/2015 | Chung et al. | |
| 2015/0171641 A1* | 6/2015 | Sato | H02J 7/0013 320/107 |
| 2015/0255999 A1* | 9/2015 | Kim | H02J 7/0042 320/134 |
| 2016/0190821 A1* | 6/2016 | Lee | H02J 7/007 320/134 |

FOREIGN PATENT DOCUMENTS

| | | |
|---|---|---|
| EP | 2916417 A1 | 9/2015 |
| JP | 2010-97760 A | 4/2010 |
| KR | 10-2011-0062852 A | 6/2011 |
| KR | 10-2011-0084751 A | 7/2011 |
| KR | 10-2012-0038331 A | 4/2012 |
| KR | 10-1215396 B1 | 12/2012 |
| KR | 10-1322617 B1 | 10/2013 |
| KR | 10-1331183 B1 | 11/2013 |
| WO | WO 2014/170373 A3 | 10/2014 |

OTHER PUBLICATIONS

EPO Extended Search Report dated Jan. 17, 2017, for corresponding European Patent Application No. 16190578.1 (8 pages).

\* cited by examiner

| PERIODS/AMOUNTS OF ACCUMULATED POWER CONSUMPTION | FIRST PERIOD(S1) | SECOND PERIOD(S2) | THIRD PERIOD(S3) | FOURTH PERIOD(S4) | FIFTH PERIOD(S5) | SIXTH PERIOD(S6) | SEVENTH PERIOD(S7) |
|---|---|---|---|---|---|---|---|
| | 50kwh | 60kwh | 100kwh | 150kwh | 180kwh | 220kwh | 150kwh |

FIG. 5

UNINTERRUPTIBLE POWER SUPPLY

CROSS-REFERENCE TO RELATED APPLICATION

This application claims priority to and the benefit of Korean Patent Application No. 10-2015-0135348, filed on Sep. 24, 2015, in the Korean Intellectual Property Office, the disclosure of which is incorporated herein in its entirety by reference.

BACKGROUND

1. Field

One or more aspects of embodiments of the present invention relate to an uninterruptible power supply.

2. Description of the Related Art

In general, uninterruptible power supplies (UPSs) refer to automatic systems for immediately supplying power without interruption in case of a power outage or failure. UPSs are components of electronic devices such as computers requiring continuous (e.g., uninterrupted) supply of power. Even when the voltage or frequency of the electricity varies or the electricity is momentarily cut off, UPSs stably supply electricity, thereby reducing the likelihood of (or preventing) destruction or loss of computer data and avoiding the shutdown or malfunction of control devices.

However, UPSs generally do not have a function of managing the power of energy storage systems, and thus additional energy management systems are required for efficient power management.

SUMMARY

Additional aspects will be set forth in part in the description which follows and, in part, will be apparent from the description, or may be learned by practice of the presented embodiments.

According to one or more embodiments of the present invention, an uninterruptible power supply (UPS) includes: a battery unit connected to an external grid to receive electricity from the grid and connected to an external load to supply electricity to the load, the battery unit including a plurality of battery racks each battery rack including a plurality of rack battery management systems (BMSs), the battery racks being divided into at least one first battery rack including a first battery and at least one second battery rack including a second battery; an overall control unit configured to determine an operation mode of the battery unit from among a discharge mode and a charge mode, wherein in the discharge mode, the overall control unit is configured to control the first and second battery racks such that the first battery of the first battery rack is discharged to a first reference value of state of charge (SOC) and the second battery of the second battery rack is discharged to a second reference value of SOC; and a measurement unit configured to monitor an amount of accumulated power consumption of the load during each of a plurality of time periods and transmitting data associated with the monitoring to the overall control unit, wherein the overall control unit is configured to determine whether to operate the battery unit in the discharge mode based on data generated by the measurement unit in each of the time periods, and wherein the first reference value of SOC is lower than a high degradation rate band, and the second reference value of SOC is set to be higher than the high degradation rate band.

Lifespan decrease rates of the batteries may vary according to the SOCs of the batteries when the batteries are not operated, and wherein the lifespan decrease rates of the batteries having SOCs in the high degradation rate band may be greater than an average of the lifespan decrease rates of the batteries.

The overall control unit may be configured to determine the discharge mode as the operation mode of the battery unit, when the amount of accumulated power consumption of the load measured by the measurement unit becomes greater than a first reference electricity amount in a given time period.

The overall control unit may be configured to, after determining the operation mode of the battery unit to be the discharge mode, stop operation of the battery unit in the discharge mode when the given time period ends, or the first battery of the first battery rack is discharged to the first reference value of SOC and the second battery of the second battery rack is discharged to the second reference value of SOC.

The overall control unit may be configured to, after the battery unit stops operation in the discharge mode, discharge the first and second batteries of the first and second battery racks when the amount of accumulated power consumption of the load exceeds a second reference electricity amount, the overall control unit may without limit to the first and second reference values.

The UPS may further include: at least one first DC-DC converter connected to the first battery rack and controlled by the overall control unit; and at least one second DC-DC converter connected to the second battery rack and controlled by the overall control unit.

The overall control unit may be configured to control the first and second DC-DC converters so as to maintain SOC of the battery racks to be outside the high degradation rate band.

The overall control unit may be configured to control the first and second battery racks in the discharge mode such that the second battery of the second battery rack may be discharged to the first reference value of SOC, and the first battery of the first battery rack may be discharged to the second reference value of SOC when a switching condition is satisfied.

The switching condition may be satisfied when the numbers of discharge times of the first and second battery racks reach a preset value.

The switching condition may be satisfied when an amount of accumulated discharge of the first or second battery rack reaches a preset value.

The rack BMSs may determine SOCs of the battery racks, respectively, and the rack BMSs may transmit the determined SOCs of the battery racks to the overall control unit.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the scope of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus descriptions thereof will not be repeated. In the drawings, the relative sizes of elements, layers, and regions may be exaggerated for clarity.

It will be understood that although the terms "first" and "second" are used herein to describe various elements, these elements should not be limited by these terms. Terms are only used to distinguish one element from other elements.

In the following description, the technical terms are used only for explaining a specific exemplary embodiment while not limiting the inventive concept. The terms of a singular form may include plural forms unless referred to the contrary. The meaning of 'include' or 'comprise' specifies a property, a fixed number, a step, a process, an element, a component, and a combination thereof but does not exclude other properties, fixed numbers, steps, processes, elements, components, and combinations thereof. It will be understood that although the terms "first" and "second" are used herein to describe various elements, these elements should not be limited by these terms. Terms are only used to distinguish one element from other elements.

Hereinafter, the exemplary embodiments will be described in detail with reference to the accompanying drawings. In the drawings, like reference numerals denote like elements, and repeated descriptions thereof will be omitted.

Figure 1:
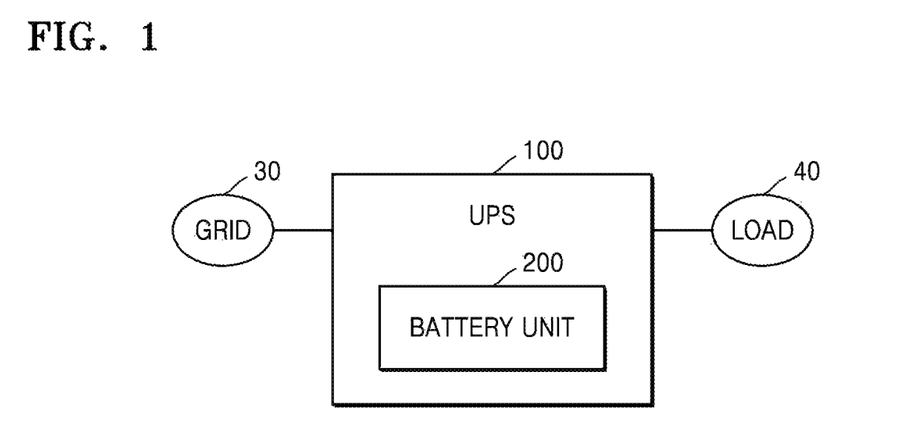
FIG. 1 is a block diagram illustrating an uninterruptible power supply (UPS) and peripheral structures thereof according to one embodiment of the present invention.

FIG. 1 is a schematic view illustrating an uninterruptible power supply (UPS) 100 and peripheral structures thereof according to an example embodiment of the present invention.

An electric power grid (or power grid or grid) 30 includes power plants, substations, transmission lines, etc. In a normal state, the grid 30 supplies electricity to a load 40 and/or a battery unit 200 of the UPS 100. However, if the grid 30 is in an abnormal state, electricity may not be transmitted from the grid 30 to the UPS 100, and thus electricity may be transmitted from the battery unit 200 of the UPS 100 to the load 40.

The load 40 consumes electricity supplied from the grid 30 and/or the battery unit 200. For example, the load 40 may include electrical devices installed in a home or a plant (e.g., a manufacturing plant).

The UPS 100 is an automatic system configured to immediately supply electricity without interruption in case of a power outage or failure. The UPS 100 may be an integral part of an electronic device such as a computer requiring the continuous supply of power. If the voltage or frequency of electricity supplied from the grid 30 varies or the supply of electricity from the grid 30 is momentarily interrupted or changed, the UPS 100 stably supplies electricity, thereby preventing or reducing the likelihood of destruction, loss, or deletion of computer data and preventing or reducing the likelihood of shutdown or malfunction of control devices.

According to the example embodiment, although the grid 30 is not in an abnormal state, the UPS 100 may supply electricity to the load 40 as an energy storage device. For example, in a normal state, the UPS 100 may be used as an energy storage device. In a normal state, the battery unit 200 of the UPS 100 may supply electricity to the load 40 together with the grid 30 by taking into consideration the peak hours of power consumption or the cost of electricity. The battery unit 200 may be charged overnight with electricity supplied from the grid 30. However, because the UPS 100 is designed to continuously supply power even when it is difficult to receive power from the grid 30, when the UPS 100 operates as an energy storage device in a normal state, the UPS 100 maintains the amount of electricity stored in the battery unit 200 at a certain value or higher.

Figure 2:
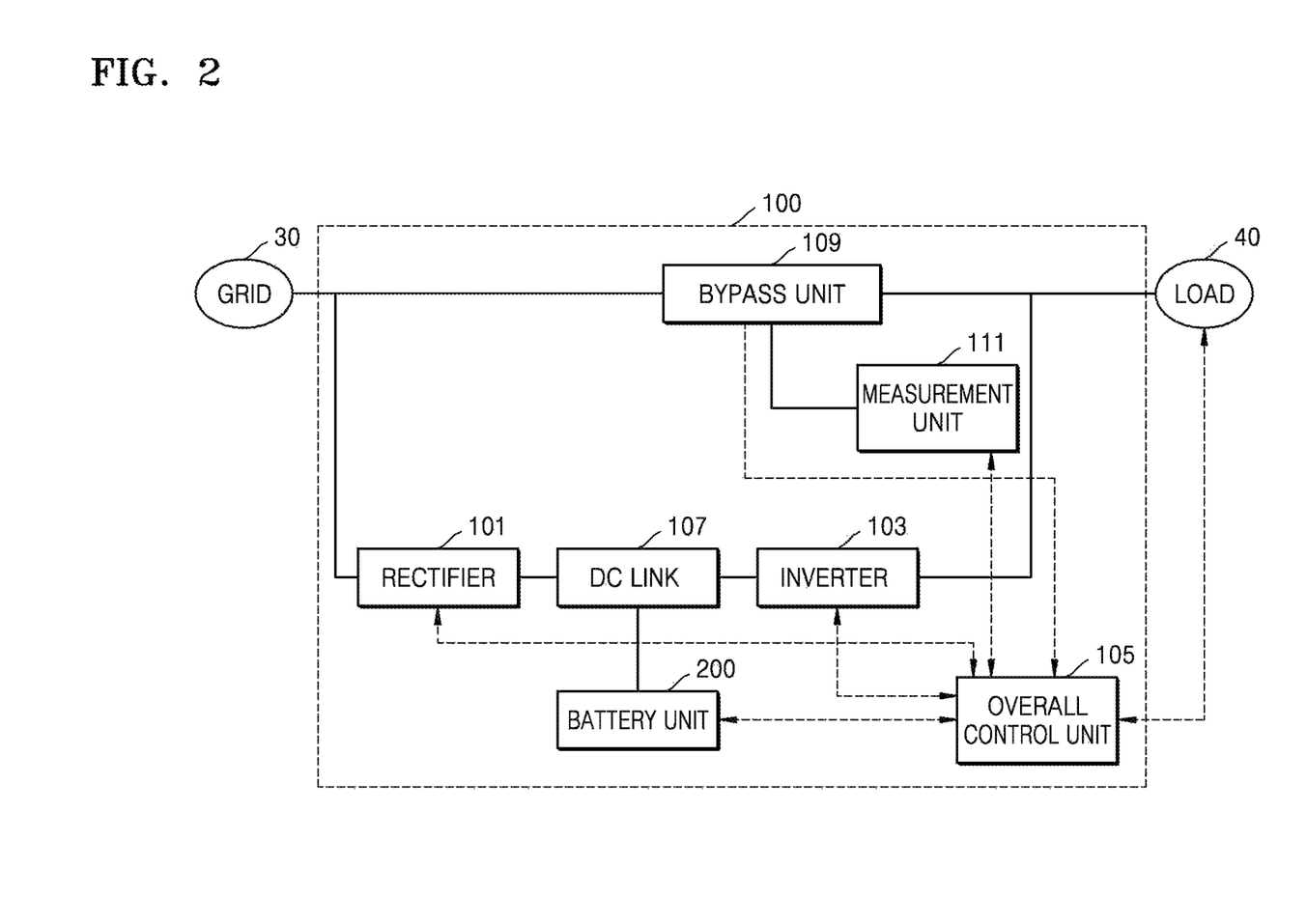
FIG. 2 is a block diagram illustrating the UPS according to one embodiment of the present invention.

FIG. 2 is a block diagram illustrating the UPS 100 according to an example embodiment of the present invention.

Referring to FIG. 2, the UPS 100 includes a rectifier 101, an inverter 103, a direct current (DC) link 107, and the battery unit 200. The battery unit 200 includes a plurality of battery racks 210 (see FIG. 3) and a plurality of DC-DC converters 230 (see FIG. 3).

The inverter 103 is connected between the load 40 and the rectifier 101. In discharge mode, the inverter 103 may convert DC voltage output from the battery unit 200 into alternating current (AC) voltage according to the type of voltage (e.g., to match the voltage) of the grid 30. The inverter 103 may be a bi-directional inverter having invertible input and output sides.

The inverter 103 may include a filter to remove harmonics from AC voltage output to the grid 30. In addition, the inverter 103 may include a phase locked loop (PLL) circuit to synchronize the phase of AC voltage output from the inverter 103 with the phase of AC voltage of the grid 30 and thus to reduce reactive power. In addition, the inverter 103 may have a function such as limiting the range of voltage variation, improving a power factor, removing a DC component, or providing protection during transient phenomena. The operation of the inverter 103 may be stopped when the inverter 103 is not used so as to reduce or minimize power consumption.

In charge mode, the rectifier 101 rectifies AC voltage of the grid 30 as DC voltage so as to store electricity of the grid 30 in the battery unit 200. The rectifier 101 may include a semiconductor rectifier, an electron tube rectifier, or a mechanical rectifier.

The DC link 107 is connected between the rectifier 101 and the inverter 103 for maintaining DC link voltage at a constant level. The level of the DC link voltage may become unstable because of an event such as a momentary voltage drop at the grid 30 or the occurrence of a peak in the load 40. The DC link voltage is stabilized to provide stable operation of the inverter 103 and the battery unit 200. To this end, the DC link 107 is connected among (e.g., between) the battery unit 200, the inverter 103, and the rectifier 101, and for example, the DC link 107 may include a high-capacitance capacitor.

The bypass unit 109 is connected between the grid 30 and the load 40. The bypass unit 109 may form a power supply path separate from a power supply path formed by the UPS 100 between the grid 30 and the load 40. The bypass unit 109 may allow for transmission of power from the grid 30 to the load 40 through the UPS 100 or direct transmission of power from the grid 30 to the load 40. The bypass unit 109 may include a relay switch. If the phase of power of the grid 30 is abnormal or the grid 30 supplies power abnormally, the bypass unit 109 may interrupt the power transmission path between the grid 30 and the load 40. If the power of the grid 30 is normal, the bypass unit 109 may open the power transmission path to allow for direct transmission of power from the grid 30 to the load 40.

A measurement unit 111 may measure the amount of power supplied to the load 40 according to time periods. After a time period (e.g., a preset time period), the measurement unit 111 may newly measure the amount of accumulated power supplied to the load 40 during the next time period (e.g., the next preset time period). For example, the measurement unit 111 may measure the amount of power supplied to the load 40 for each time period (e.g., each preset time period). For example, if a time period (e.g., a preset time period) is 15 minutes, 24 hours may be divided by 15 minutes into 96 time periods, and the measurement unit 111 may measure an amount of accumulated power for each of the time periods. Amounts of accumulated power measured for respective ones of the time periods may be transmitted from the measurement unit 111 to an overall control unit 105, and the measurement unit 111 may inform the overall control unit 105 if any one of the amounts of accumulated power is greater than a threshold value (e.g., a preset value). In addition, the measurement unit 111 may measure power supplied from the grid 30 to the load 40 and power supplied from the UPS 100 to the load 40, or may measure only power supplied from the grid 30 to the load 40.

The overall control unit 105 may monitor states of the grid 30, the battery unit 200, and the load 40, and may control operations of the inverter 103, the rectifier 101, and the battery unit 200 according to results of the monitoring, an algorithm (e.g., a preset algorithm), etc. The overall control unit 105 may monitor the occurrence of a power failure in the grid 30, the state of charge of (SOC) the battery unit 200, the amount of power consumption of (or amount of power consumed by) the load 40, time, etc. In addition, if insufficient power is supplied, for example, due to a power failure in the grid 30, the overall control unit 105 may determine the priorities of power-consuming devices of the load 40 and may control the load 40 to supply power according to the priorities of the power-consuming devices.

In one embodiment, the UPS 100 may have an energy storing function. The overall control unit 105 may determine the operation mode of the battery unit 200 based on the current time, the SOC of the battery unit 200, the price of electricity supplied from the grid 30 to the load 40, or the amount of power consumed by the load 40. During a time period in which the price of electricity supplied from the grid 30 to the load 40 is relatively high or the power consumption of the load 40 is at its peak, the overall control unit 105 may determine (or select or identify) a discharge mode as the operation mode of the battery unit 200. On the other hand, during an overnight (or midnight) period in which the price of electricity supplied from the grid 30 to the load 40 is relatively low or a time period in which the power consumption of the load 40 is relatively low, the overall control unit 105 may determine (or select or identify) a charge mode as the operation mode of the battery unit 200. If the batteries 213 of the battery unit 200 are fully charged, the overall control unit 105 may determine (or select or identify) a discharge mode as the operation mode of the battery unit 200 so as to improve the efficiency of power consumption. In addition, if the current time is close to a midnight (or overnight) electricity time period, the overall control unit 105 may determine a discharge mode as the operation mode of the battery unit 200.

The battery unit 200 may be charged by power supplied from the grid 30 through the DC link 107 or may supply power to the load 40 or the grid 30.

Figure 3:
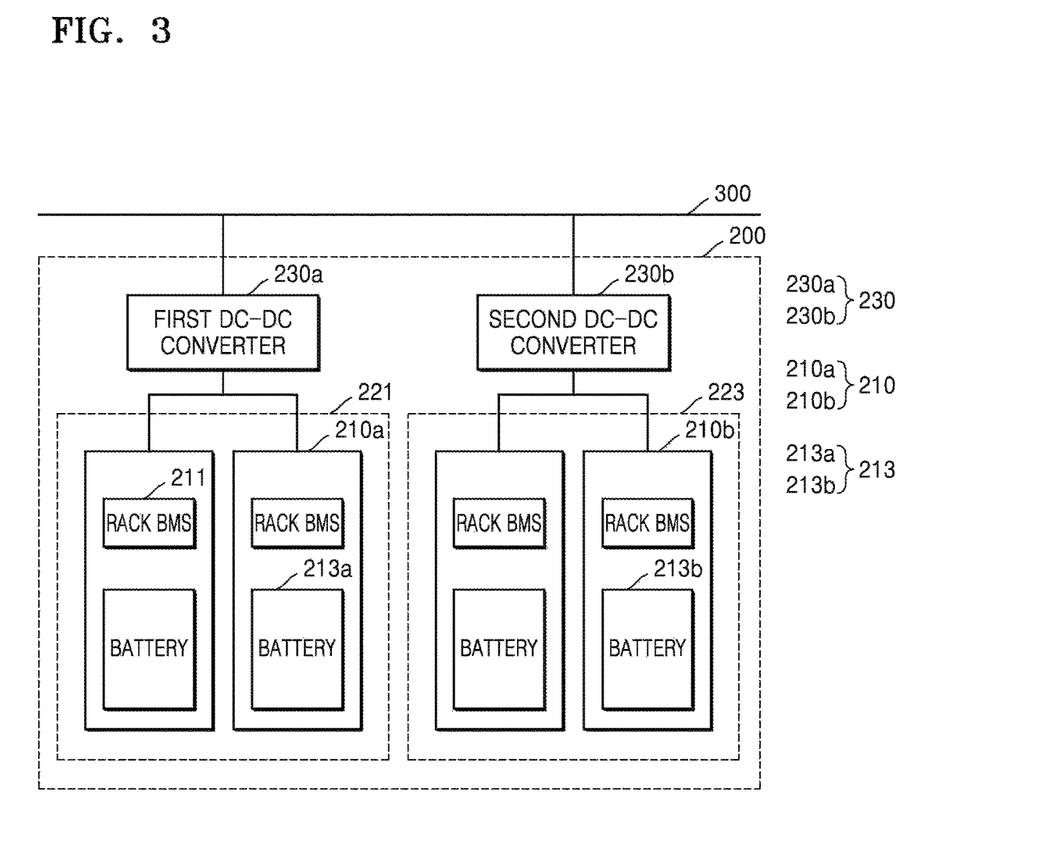
FIG. 3 is a block diagram illustrating a battery unit according to one embodiment of the present invention.

FIG. 3 is a block diagram illustrating the battery unit 200 according to an example embodiment of the present invention.

Referring to FIG. 3, the battery unit 200 may include the plurality of battery racks 210 and the plurality of DC-DC converters 230. The battery racks 210 may be divided into a first group 221 and a second group 223. The battery racks 210 of the first group 221 may be referred to as first battery racks 210*a*, and the battery racks 210 of the second group 223 may be referred as second battery racks 210*b*. A DC-DC converter 230 connected to the first battery racks 210*a* may be referred to as a first DC-DC converter 230*a*, and a DC-DC converter 230 connected to the second battery racks 210*b* may be referred to as a second DC-DC converter 230*b*.

The battery racks 210 may include rack battery management systems (BMSs) 211 and batteries 213. The batteries 213 of the first battery racks 210*a* may be referred to as first batteries 213*a*, and the batteries 213 of the second battery racks 210*b* may be referred to as second batteries 213*b*. In some embodiments of the present invention, each of the battery racks may include one or more battery packs.

The rack BMSs 211 control charging and discharging operations of the batteries 213 of the battery racks 210. The rack BMSs 211 may monitor states of the batteries 213 such as SOC, voltage, or current, and may transmit data obtained by the monitoring to the overall control unit 105. The overall control unit 105 may transmit control signals to the rack BMSs 211 based on the data received from the rack BMSs 211.

The batteries 213 may store electricity and may include battery cells as sub-structures. The number of battery cells included in each of the batteries 213 may be determined according to a required output voltage. Various secondary battery cells may be used as the battery cells of the batteries 213. Examples of the battery cells may include nickel-cadmium battery cells, lead battery cells, nickel metal hydride (NiMH) battery cells, lithium-ion battery cells, and lithium polymer battery cells.

The batteries 213 may include a plurality of battery trays. In addition, the battery racks 210 may include a plurality of tray BMSs respectively controlling the battery trays. The tray BMSs may detect states such as voltages, currents, or temperatures of battery cells of the battery trays respectively corresponding to the tray BMSs and may transmit detected data to the rack BMSs 211. The rack BMSs 211 may analyze the data received from the tray BMSs to determine the states of the batteries 213 such as SOC or state of health (SOH) and may transmit determined data to the overall control unit 105.

The DC-DC converters 230 are connected between the DC link 107 and the batteries 213 of the battery racks 210 for conversion between DC link voltage of the DC link 107 and voltages of the batteries 213. In charge mode, the DC-DC converters 230 may convert the DC link voltage of the DC link 107 into charge voltage for charging the batteries 213. In discharge mode, the DC-DC converters 230 may convert the voltages of the batteries 213 into voltages to be output to the DC link 107. At this time, the levels of voltages output from the DC-DC converters 230 may be higher than the level of the DC link voltage of the DC link 107, thereby discharging the batteries 213. If it is not necessary to charge or discharge the battery unit 200, the DC-DC converters 230 may not be operated so as to reduce or minimize power consumption.

The first battery racks 210a of the first group 221 may include some of the battery racks 210, and the second battery racks 210b of the second group 223 may include the rest battery racks 210. The number of the first battery racks 210a and the number of the second battery racks 210b may be equal.

The UPS 100 is a device for stably supplying power to the load 40 when the grid 30 has errors or problems. For example, the overall control unit 105 may control the battery unit 200 of the UPS 100 so that the amount of electricity stored in the battery unit 200 may be maintained to be equal to or higher than a certain value for stably supplying electricity to the load 40 even when a power outage occurs in the grid 30. Even when the battery unit of the UPS 100 supplies electricity to the load 40, the overall control unit 105 may control the battery unit 200 so that the battery unit 200 may be discharged only to a certain degree instead of being fully discharged. For example, the overall control unit 105 may allow the first batteries 213a of the first group 221 to be discharged to a first reference value of SOC and the second batteries 213b of the second group 223 to be discharged to a second reference value of SOC, so as to maintain the amount of electricity stored in the battery unit 200 at a certain value or higher. In the following description, unless otherwise mentioned, it is assumed that the first batteries 213a of the first group 221 are discharged to the first reference value of SOC, and the second batteries 213b of the second group 223 are discharged to the second reference value of SOC.

When the batteries 213 are not in use, the lifespan decrease rate of each of the batteries 213 varies depending on the SOC of the battery 213. A range of SOC in which the lifespan decrease rates of the batteries 213, which vary depending on the states of charge (SOC) of the batteries 213, are higher than the average of the lifespan decrease rates of the batteries 213 may be set as an high degradation rate band (or an evasion charging band). The high degradation rate band may vary according to the types and properties of the batteries 213 of the battery racks 210. For example, when the batteries 213 of the battery unit 200 are not in use after the batteries 213 are discharged to a certain value of SOC in preparation for a power outage, if the certain value of SOC is in the high degradation rate band, the lifespans of the batteries 213 may be negatively affected because the lifespan decrease rates of the batteries 213 in the high degradation rate band are relatively high. Therefore, the first and second reference values may be set to be different for maintaining the first and second batteries 213a and 213b of the first and second groups 221 and 223 at different states of charge (SOC). This will now be described in more detail below.

According to one embodiment of the present invention, the first and second reference values may be set to be outside the high degradation rate band. For example, if the high degradation rate band is from 40% to 60%, the first reference value may be set to be lower than 40%, and the second reference value may be set to be higher than 60%. In addition, the first and second reference values may be set such that even after the first and second batteries 213a and 213b of the first and second groups 221 and 223 are discharged in discharge mode, the amount of electricity stored in the battery unit 200 may be equal to or greater than a certain value in preparation for a power outage. For example, if the certain value is 50% of the capacity of the battery unit 200, the first reference value may be set to be 80%, and the second reference value may be set to be 20%. In this case, after the battery unit 200 is discharged in discharge mode, the SOC of the first batteries 213a of the first group 221 may be 80%, and the SOC of the second batteries 213b of the second group 223 may be 20%. Thus, the UPS 100 may have a certain amount of electricity in preparation for a power outage.

In another embodiment of the present invention, the overall control unit 105 may determine whether to operate the battery unit 200 in discharge mode based on the amount of accumulated power consumption of the load 40 measured for each time period (e.g., each preset time period) by the measurement unit 111. If the amount of accumulated power consumption measured for each time period (e.g., each preset time period) by the measurement unit 111 is greater than a first reference electricity amount, the battery unit 200 is discharged. Then, if the first batteries 213a of the first group 221 are discharged to the first reference value of SOC, and the second batteries 213b of the second group 223 are discharged to the second reference value of SOC, the overall control unit 105 stops the discharging of the battery unit 200. In this state, even though the amount of accumulated power consumption of the load 40 in the next time period (e.g., the next preset time period) exceeds the first reference electricity amount, the battery unit 200 may not be operated in discharge mode. The reason for this is to maintain the amount of electricity stored in the UPS 100 at a certain value in preparation for a power outage.

In another example embodiment of the present invention, the overall control unit 105 may switch the first and second reference values respectively set for the first batteries 213a of the first group 221 and the second batteries 213b of the second group 223. In discharge mode, the overall control unit 105 may control the first batteries 213a of the first group 221 and the second batteries 213b of the second group 223 such that the first batteries 213a may be discharged to the second reference value of SOC, and the second batteries 213b may be discharged to the first reference value of SOC. The overall control unit 105 may determine whether a switching condition (e.g., a preset switching condition) is satisfied. If the overall control unit 105 determines that the switching condition (e.g., the preset switching condition) is satisfied, the overall control unit 105 may perform the above-mentioned switching operation.

For example, it may be determined that the switching condition (e.g., the preset switching condition) is satisfied if the number of times the batteries 213 of the battery unit 200 are discharged is equal to a threshold number or the amount of accumulated discharge of the batteries 213 of the battery unit 200 becomes equal to a threshold value (e.g., a preset value). The number of times (e.g., preset number of times) or the amount (e.g., the preset amount) of accumulated discharge may be set to be multiples of N (where N is an integer) so as to constantly perform the switching operation. The overall control unit 105 may determine whether the switching condition (e.g., the preset switching condition) is satisfied by determining whether one of the batteries 213 is charged and discharged a number of times (e.g., a preset number of times). The number of charge/discharge times may be set to be multiples of 10. The numbers of times switching to charge mode, discharge mode, and power outage mode are equal to the number of charge/discharge times. Therefore, each time when the number of times of mode switching is 10, 20, 30, and so on, the switching condition (e.g., the preset switching condition) is satisfied. The number of charge/discharge times may be counted by counting the number of discharge times.

In another embodiment of the present invention, the overall control unit 105 may determine whether the switching condition (e.g., the preset switching condition) is satisfied by determining whether the amount of accumulated discharge of the first batteries 213a of the first group 221 or the second batteries 213b of the second group 223 reaches a threshold amount of discharge (e.g., a preset amount of discharge). For example, the threshold amount of accumulated discharge may be set to be a multiple of 350% such as 350%, 700%, 1050%, or the like. If the first reference value is 30% and the second reference value is 70%, the amount of discharge of the first batteries 213a of the first group 221 is 70% when the first batteries 213a are discharged to the first reference value after be fully charged, and the amount of discharge of the second batteries 213b of the second group 223 is 30% when the second batteries 213b are discharged to the second reference value after being fully charged. In this case, if the number of times the first batteries 213a of the first group 221 are fully charged and then discharged to the first reference value is five, the amount of accumulated discharge is 350%, and thus the switching condition (e.g., the preset switching condition) is satisfied.

Figure 4:
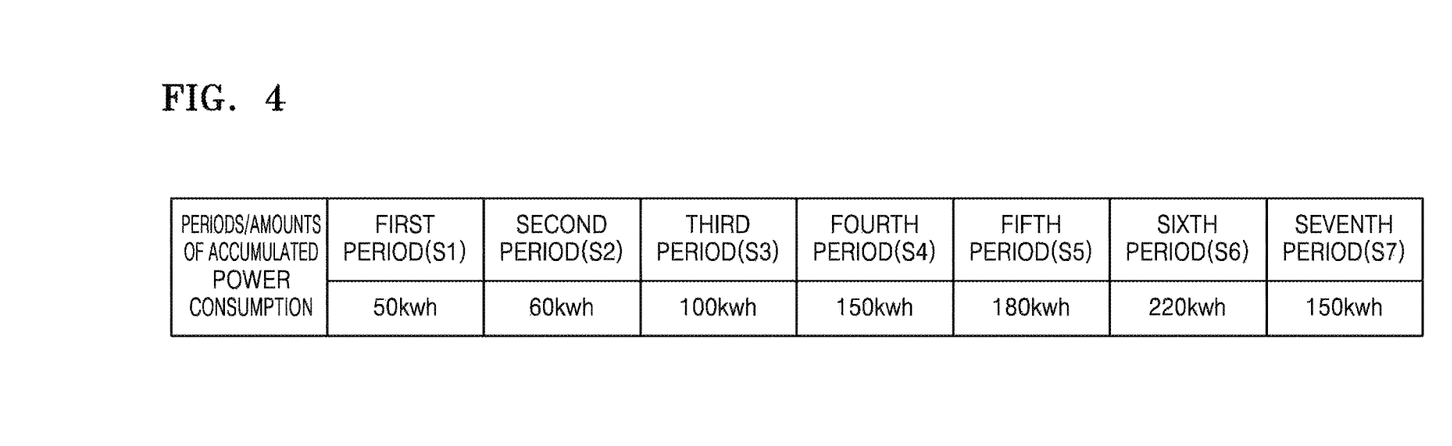
FIG. 4 is an exemplary table illustrating the amount of accumulated power consumption of a load measured in each time period by a measurement unit according to one embodiment of the present invention.

FIG. 4 is an table illustrating the amount of accumulated power consumption of the load 40 measured in each time period by the measurement unit 111 according to one embodiment of the present invention.

Referring to FIG. 4, a particular time range of a day is divided into first to seventh periods (e.g., first, second, third, fourth, fifth, sixth, and seventh periods) S1 to S7 (e.g., S1, S2, S3, S4, S5, S6, and S7). The measurement unit 111 may separately accumulate the amount of power supplied from the grid 30 to the load 40 during each of the first to seventh periods S1 to S7. The amount of accumulated power consumption in each of the first to seventh periods S1 to S7 refers to the amount of power supplied from the grid 30 to the load 40 during each of the first to seven periods S1 to S7. For example, the amount of power consumption is separately accumulated in each of the first to seven periods S1 to S7.

The amounts of accumulated power consumption in the first to seven periods S1 to S7 are obtained by repeatedly measuring the amount of accumulated power consumed in each of the time periods (e.g., the first to seven periods S1 to S7). The time periods (or preset time periods) may be set by dividing 24 hours of a day into N periods. In each period, the amount of accumulated power consumption is measured by the measurement unit 111 by accumulating the amount of power consumed by the load 40. For example, the time periods (or preset time periods) may be determined based on a particular time period which is set by an electricity provider to calculate basic charges in electricity bills. For example, an electricity provider may accumulate the amount of power consumption of the load 40 for each 15-minute period to calculate a basic electricity charge. Thus, each of the time periods (or preset time periods) may be set as a 15-minute period.

According to an example embodiment of the present invention, the overall control unit 105 may limit the amount of power that the load 40 receives from the grid 30 in each of the time periods (e.g., the preset time periods). The overall control unit 105 may determine whether to supply electricity of the battery unit 200 to the load 40 in each of the time periods (e.g., the preset time periods). For example, if the amount of power consumption of the load 40 in each period exceeds a first reference electricity amount, the overall control unit 105 may operate the battery unit 200 in discharge mode so as to limit the supply of power from the grid 30 to the load 40. The measurement unit 111 monitors the amount of power supplied from the grid 30 to the load 40 in each period, and the overall control unit 105 receives information about results of the monitoring. Then, the overall control unit 105 checks whether the amount of power consumption of the load 40 (e.g., the power consumption of the load 40) exceeds the first reference electricity amount based on the received information. If it is determined that the amount of power consumption of the load 40 exceeds the first reference electricity amount, the overall control unit 105 operates the battery unit 200 in discharge mode. Then, the load 40 receives power from the battery unit 200 instead of the grid 30 under the control of the overall control unit 105. Owing to the supply of power from the battery unit 200 to the load 40, the supply of power from the grid 30 to the load 40 may be limited to an extent (e.g., a predetermined extent). For example, if the first reference electricity amount is set to be 120 kWh, because the amount of power consumption of the load 40 is less than 120 kWh in each of the first to third periods S1 to S3 (e.g., first, second, and third periods S1, S2, and S3), only the grid 30 supplies electricity to the load 40 in the first to third periods S1 to S3. However, the amount of power consumption of the load 40 exceeds 120 kWh in each of the fourth to seventh periods S4 to S7 (e.g., fourth, fifth, sixth, and seventh periods S4, S5, S6, and S7). In the fourth period S4, because the amount of accumulated power consumption of the load 40 is greater than 120 kWh, the overall control unit 105 discharges the battery unit 200 when the amount of accumulated power consumption of the load 40 becomes equal to or greater than 120 kWh so as to supply the amount of electricity exceeding 120 kWh from the battery unit 200 to the load 40. Thus, the amounts of electricity supplied to the load 40 from the battery unit 200 may be 30 kWh in the fourth period S4, 60 kWh in the fifth period S5, 100 kWh in the sixth period, and 30 kWh in the seventh period S7. After the amount of power consumption of the load 40 exceeds the first reference electricity amount, the battery unit 200 may alone supply electricity to the load 40, or both the battery unit 200 and the grid 30 may supply electricity to the load 40.

According to an example embodiment of the present invention, the overall control unit 105 may determine (or identify or select) the operation mode of the battery unit 200 in each of the first to seventh periods S1 to S7. If the amount of power consumption of the load 40 exceeds the first reference electricity amount during a given time period, the overall control unit 105 operates the battery unit 200 in discharge mode, and after the time period, the overall control unit 105 stops the operation of the battery unit 200 in the discharge mode. For example, the battery unit 200 may be operated in discharge mode in the fourth period S4 to supply power to the load 40. However, when the fifth period S5 starts after the fourth period S4, the operation of the battery unit 200 in the discharge mode is stopped. Thereafter, if the amount of power consumption of the load 40 exceeds the first reference electricity amount in the fifth period S5, the overall control unit 105 starts to operate the battery unit 200 in discharge mode.

For example, an electricity provider supplying power through the grid 30 may consider the amount of power consumption of the load 40 during a particular time period when calculating a basic electricity charge in an electricity bill. Therefore, the amount of power consumption can be limited in the particular time period so as to reduce the basic electricity charge. For example, the charge rate is relatively high for peak hours, and if the amount of power consumption of the load 40 increases during the peak hours, the basic charge may markedly increase. Therefore, the amount of power consumption of the load 40 accumulated during a particular time period can be maintained at a level not significantly exceeding a certain value. According to an example embodiment of the present invention, if the amount of power consumption of the load 40 exceeds a certain value, the overall control unit 105 may operate the battery unit 200 to supply electricity stored in the battery unit 200 to the load 40, and thus the amount of power consumption of the load 40 accumulated for a particular time period may be adjusted to be within a certain range. In this case, users may obtain economical benefits from the use of the UPS 100, and the UPS 100 may be used more efficiently.

According to an embodiment of the present invention, even though the amount of power supplied from the grid 30 to the load 40 exceeds the first reference electricity amount in each period, the overall control unit 105 may not operate the battery unit 200 in discharge mode. As described with reference to FIG. 3, the amounts of discharge of the first and second groups 221 and 223 are limited. After the first batteries 213a of the first group 221 are discharged to the first reference value of SOC, and the second batteries 213b of the second group 223 are discharged to the second reference value of SOC, the first batteries 213a of the first group 221 and the second batteries 213b of the second group 223 are not further discharged. For example, if the amount of accumulated power consumption of the load 40 exceeds the first reference electricity amount in a given time period, the overall control unit 105 may discharge the battery unit 200 to supply electricity to the load 40. In this case, however, if the batteries 213 of the battery unit 200 are discharged to the first and second reference values of SOC, the overall control unit 105 may not further discharge the battery unit 200 even though the amount of accumulated power consumption of the load 40 exceeds the first reference electricity amount in the given time period.

In another embodiment of the present invention, if the amount of accumulated power consumption of the load 40 exceeds a second reference electricity amount in a given time period, the overall control unit 105 may discharge the battery unit 200 without limit to the first and second reference values of SOC described with reference to FIG. 3. In the following example, it is assumed that the first reference electricity amount is 120 kWh, and the second reference electricity amount is 200 kWh. If it is determined that the amount of accumulated power consumption of the load 40 exceeds the first reference electricity amount, the overall control unit 105 operates the battery unit 200 in discharge mode. As described with reference to FIG. 3, in discharge mode, the overall control unit 105 may stop discharging of the battery unit 200 after the first batteries 213a of the first group 221 are discharged to the first reference value of SOC and the second batteries 213b of the second group 223 are discharged to the second reference value of SOC. For example, in the fifth period S5, the overall control unit 105 may stop the operation of the battery unit 200 in discharge mode after the first and second batteries 213a and 213b of the first and second groups 221 and 223 are discharged to the first and second reference values of SOC. In the sixth period S6, even though the amount of accumulated power consumption of the load 40 exceeds the first reference electricity amount, the battery unit 200 may not be discharged. Thereafter, if the amount of accumulated power consumption of the load 40 exceeds 200 kWh, the overall control unit 105 may discharge the battery unit 200 without limiting discharging of the first and second batteries 213a and 213b of the first and second groups 221 and 223 to the first and second reference values of SOC.

Figure 5:
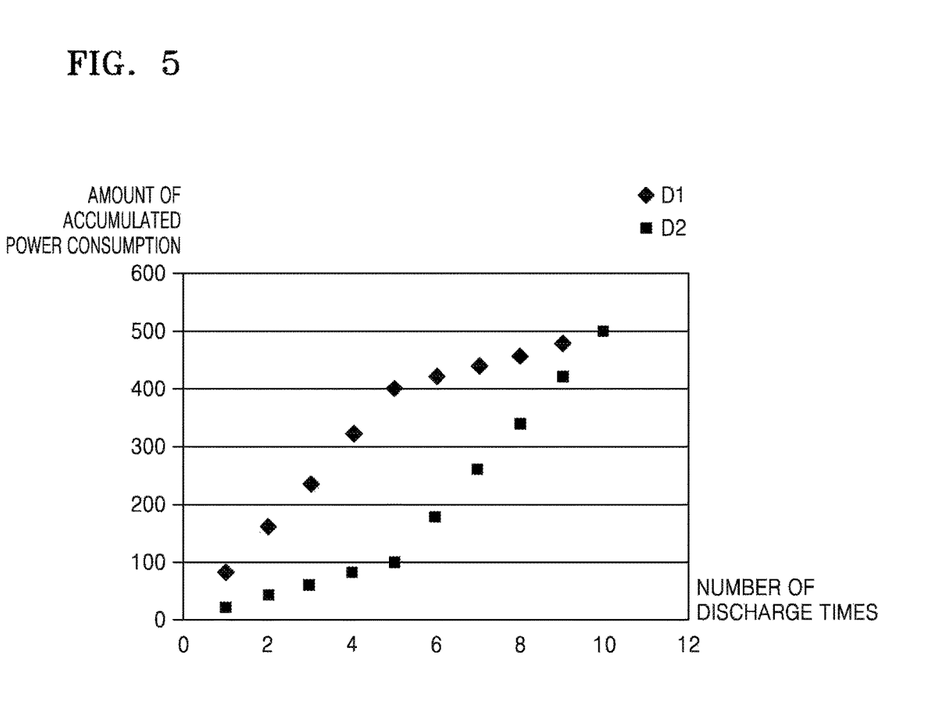
FIG. 5 is an exemplary graph illustrating the amounts of accumulated discharge of first and second batteries of first and second groups with respect to the number of discharge times according to one embodiment of the present invention.

FIG. 5 is an graph illustrating the amounts of accumulated discharge of the first and second batteries 213a and 213b of the first and second groups 221 and 223 with respect to the numbers of times the first and second batteries 213a and 213b are discharged according to one embodiment of the present invention.

Referring to FIG. 5, the horizontal axis denotes the number of discharge times or the number of times switched to discharge mode, and the vertical axis denotes the amounts of accumulated discharge of the first and second batteries 213a and 213b of the first and second groups 221 and 223. First points D1 denote the amount of accumulated discharge of the first batteries 213a of the first group 221 with reference to the number of discharge times, and second points D2 denote the amount of accumulated discharge of the second batteries 213b of the second group 223 with respect to the number of discharge times.

The amounts of accumulated discharge are given in percent (%), and in the following description, it will be assumed that the first and second batteries 213a and 213b of the first and second groups 221 and 223 are discharged in discharge mode until the states of charge thereof reach threshold values (e.g., preset values). In addition, it is assumed that no power outage occurs and the switching condition (e.g., the preset switching condition) described with respect to FIG. 3 is satisfied each time when the number of discharge times becomes multiples of 5.

The amounts of accumulated discharge denoted by the first and second points D1 and D2 are compared while the number of discharge times is from 1 to 5. The amount of accumulated discharge denoted by the first points D1 increases by 80 for each discharge cycle, from 0 to 80, 160, 240, 320, and 400. The amount of accumulated discharge denoted by the second points D2 increases by 20 for each discharge cycle, from 0 to 20, 40, 60, 80, and 100. As the number of discharge times increases, the amount of accumulated discharge of the first batteries 213a of the first group 221 increases much more than the amount of accumulated discharge of the second batteries 213b of the second group 223. The lifespan of batteries decreases as the amount of accumulated discharge of the batteries increases. Thus, the lifespan of the first batteries 213a of the first group 221 may decrease more than the lifespan of the second batteries 213b of the second group 223 decreases. Therefore, the difference between the lifespan of the first batteries 213a of the first group 221 and the lifespan of the second batteries 213b of the second group 223 may increase with time, and thus the battery unit 200 may not be efficiently managed. Therefore, as described with reference to FIG. 3, if the switching condition (e.g., the preset switching condition) is satisfied, the first and second reference values respectively set for the first batteries 213a of the first group 221 and the second batteries 213b of the second group 223 may be switched with each other.

If the number of discharge times becomes 5, the switching condition (e.g., the preset switching condition) is satisfied. Thereafter, the first batteries 213a of the first group 221 are discharged to the second reference value of SOC, and the second batteries 213b of the second group 223 are discharged to the first reference value of SOC. For example, while the number of discharge times is from 6 to 10, the amount of accumulated discharge of the first batteries 213a of the first group 221 increases by 20 for each discharge cycle, and the amount of accumulated discharge of the second batteries 213b of the second group 223 increases by 80 for each discharge cycle. Therefore, while the number of discharge times is from 6 to 10, the first points D1 are at 420, 440, 460, 480, and 500, and the second points D2 are at 180, 260, 340, 420, and 500. When the number of discharge times is 10, the amount of accumulated discharge of the first batteries 213a of the first group 221 is equal to the amount of accumulated discharge of the second batteries 213b of the second group 223, and thus the first batteries 213a of the first group 221 and the second batteries 213b of the second group 223 may have similar lifespans.

It should be understood that example embodiments of the present invention described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An uninterruptible power supply (UPS) comprising:
   a battery unit connected to an external grid to receive electricity from the grid and connected to an external load to supply electricity to the load, the battery unit comprising a plurality of battery racks each battery rack comprising a plurality of rack battery management systems (BMSs), the battery racks being divided into at least one first battery rack comprising a first battery and at least one second battery rack comprising a second battery;
   an overall control unit configured to determine an operation mode of the battery unit from among a discharge mode and a charge mode, wherein, in the discharge mode, the overall control unit is configured to control the first and second battery racks such that the first battery of the first battery rack is discharged to a first reference value of state of charge (SOC) and the second battery of the second battery rack is discharged to a second reference value of SOC; and
   a measurement unit configured to monitor an amount of accumulated power consumption of the load during each of a plurality of time periods and transmitting data associated with the monitoring to the overall control unit,
   wherein the overall control unit is configured to determine whether to operate the battery unit in the discharge mode based on data generated by the measurement unit in each of the time periods and to supply electricity from the grid to the load when the first battery of the first battery rack is discharged to the first reference value of SOC and the second battery of the second battery rack is discharged to the second reference value of SOC, and
   wherein the first reference value of SOC is lower than a high degradation rate band corresponding to types and properties of the first battery and the second battery and the second reference value of SOC is higher than the high degradation rate band.

2. The UPS of claim 1, wherein lifespan decrease rates of the batteries vary according to the SOCs of the batteries when the batteries are not operated, and wherein the lifespan decrease rates of the batteries having SOCs in the high degradation rate band are greater than an average of the lifespan decrease rates of the batteries.

3. The UPS of claim 1, wherein the overall control unit is configured to determine the discharge mode as the operation mode of the battery unit, when the amount of accumulated power consumption of the load measured by the measurement unit becomes greater than a first reference electricity amount in a given time period.

4. The UPS of claim 3, wherein the overall control unit is configured to, after determining the operation mode of the battery unit to be the discharge mode, stop operation of the battery unit in the discharge mode when the given time period ends, or the first battery of the first battery rack is discharged to the first reference value of SOC and the second battery of the second battery rack is discharged to the second reference value of SOC.

5. The UPS of claim 4, wherein the overall control unit is configured to, after the battery unit stops operation in the discharge mode, discharge the first and second batteries of the first and second battery racks when the amount of accumulated power consumption of the load exceeds a second reference electricity amount without limit to the first and second reference values.

6. The UPS of claim 1, further comprising:
   at least one first DC-DC converter connected to the first battery rack and controlled by the overall control unit; and
   at least one second DC-DC converter connected to the second battery rack and controlled by the overall control unit.

7. The UPS of claim 6, wherein the overall control unit is configured to control the first and second DC-DC converters so as to maintain SOC of the battery racks to be outside the high degradation rate band.

8. The UPS of claim 1, wherein the overall control unit is configured to control the first and second battery racks in the discharge mode such that the second battery of the second battery rack is discharged to the first reference value of SOC, and the first battery of the first battery rack is discharged to the second reference value of SOC when a switching condition is satisfied.

9. The UPS of claim 8, wherein the switching condition is satisfied when the numbers of discharge times of the first and second battery racks reach a threshold value.

10. The UPS of claim 8, wherein the switching condition is satisfied when an amount of accumulated discharge of the first or second battery rack reaches a threshold value.

11. The UPS of claim 1, wherein the rack BMSs determine SOCs of the battery racks, and
    the rack BMSs transmit the determined SOCs of the battery racks to the overall control unit.

* * * * *